(12) United States Patent
Barua et al.

(10) Patent No.: US 8,510,723 B2
(45) Date of Patent: Aug. 13, 2013

(54) BINARY REWRITING WITHOUT RELOCATION INFORMATION

(75) Inventors: Rajeev Kumar Barua, Rockville, MD (US); Matthew Smithson, Columbia, MD (US)

(73) Assignee: University of Maryland, College Park, MD (US)

(*) Notice: Subject to any disclaimer, the term of this patent is extended or adjusted under 35 U.S.C. 154(b) by 456 days.

(21) Appl. No.: 12/785,923

(22) Filed: May 24, 2010

(65) Prior Publication Data

US 2010/0306746 A1   Dec. 2, 2010

Related U.S. Application Data

(60) Provisional application No. 61/182,551, filed on May 29, 2009.

(51) Int. Cl.
*G06F 9/45*   (2006.01)
(52) U.S. Cl.
USPC ............................ 717/136; 717/158; 717/159
(58) Field of Classification Search
None
See application file for complete search history.

(56) References Cited

U.S. PATENT DOCUMENTS

| | | | | |
|---|---|---|---|---|
| 7,367,024 B2* | 4/2008 | Barua et al. | | 717/158 |
| 7,757,221 B2* | 7/2010 | Zheng et al. | | 717/136 |
| 7,779,394 B2* | 8/2010 | Homing et al. | | 717/136 |
| 7,865,885 B2* | 1/2011 | Wu et al. | | 717/136 |
| 7,873,952 B2* | 1/2011 | Shtilman et al. | | 717/154 |
| 7,913,092 B1* | 3/2011 | Hiltunen et al. | | 713/187 |
| 8,230,479 B2* | 7/2012 | Wallace | | 717/136 |
| 2002/0199179 A1* | 12/2002 | Lavery et al. | | 717/158 |
| 2004/0111719 A1* | 6/2004 | Civlin | | 717/159 |
| 2004/0193815 A1* | 9/2004 | Haghighat et al. | | 711/158 |
| 2004/0221270 A1* | 11/2004 | Witchel et al. | | 717/136 |
| 2006/0095902 A1* | 5/2006 | Nakaike et al. | | 717/158 |
| 2007/0226717 A1* | 9/2007 | Shtilman et al. | | 717/151 |
| 2009/0144561 A1* | 6/2009 | Davidson et al. | | 713/190 |
| 2009/0320129 A1* | 12/2009 | Pan et al. | | 726/22 |
| 2010/0131932 A1* | 5/2010 | Kato et al. | | 717/136 |
| 2010/0229163 A1* | 9/2010 | Rolland | | 717/159 |
| 2010/0299657 A1* | 11/2010 | Barua et al. | | 717/136 |
| 2011/0055805 A1* | 3/2011 | Herdeg et al. | | 717/106 |
| 2011/0066829 A1* | 3/2011 | Tye et al. | | 712/226 |

OTHER PUBLICATIONS

Song et al., Utilizing Binary Rewriting for Improving End-Host Security, Dec. 2007, IEEE, IEEE Transactions on Parallel and Distributed Systems, vol. 18, No. 12, pp. 1687-1699; <http://ieeexplore.ieee.org/xpl/articleDetails.jsp?arnumber=4359394>.*

(Continued)

*Primary Examiner* — Thuy Dao
*Assistant Examiner* — Ben C Wang
(74) *Attorney, Agent, or Firm* — Squire Sanders (US) LLP

(57) ABSTRACT

A binary rewriter that can provide complete code coverage without relocation information is provided, together with a method of performing such rewriting. The method can include processing a binary file as an original binary file. The method can also include disassembling the binary file to provide a disassembled binary file. The method can further include rewriting the disassembled binary file without relocation information to provide a rewritten binary file. The rewriting can provide a physical transformation in a recording medium relative to the binary file in the recording medium prior to the rewriting. The processing the binary file, disassembling the binary file, and rewriting the disassembled binary file can be performed by a particular machine.

31 Claims, 5 Drawing Sheets

Flow diagram of an infrastructure for binary rewriting.

(56) References Cited

OTHER PUBLICATIONS

Yardimci et al. Mostly-Static Program Partitioning of Binary Executables, Apr. 2008, ACM, pp. 1-44; <http://dl.acm.org/results.cfm?h=1&cfid=98682090&cftoken=21545573>.*

Smithson et al., "Binary Rewriting without Relocation INformation", Technical report, University of Maryland, Nov. 2010, pp. 1-10; <http://www.ece.umd.edu/~barua/without-relocation-technical-report10.pdf>.*

Harris et al., "Practical Analysis of Stripped Binary Code, Dec.", 2005, ACM, vol. 33, No. 5, pp. 63-68; <http://dl.acm.org/citation.cfm?doid=1127577.1127590>.*

Smithson et al., "Binary Rewriting without Relocation Information", 2010 University of Maryland, Technical Report, Nov. 2010, pp. 1-11; <http://www.ece.umd.edu/~barua/without-relocation-technical-report10.pdf>.*

Wartell et al., "Binary Stirring: Self-randomizing Instruction Addresses of Legacy x86 Binary Code", 2012 ACM, CCS'12, Oct. 16-18, 2012, Raleigh, North Carolina, USA, pp. 1-12; <http://dl.acm.org/citation.cfm?doid=2382196.2382216>.*

Wartell et al., "Securing Untrusted Code via Compiler-Agnostic Binary Rewriting", 2012 ACM, ACSAC'12, Dec. 3-7, 2012, Orlando, Florida, USA, pp. 299-308; <http://dl.acm.org/citation.cfm?id=2420995>.*

Scott et al., "Retargetable and Reconfigurable Software Dynamic Translation", 2003 IEEE, CGO'03, pp. 1-12; <http://ieeexplore.ieee.org/stamp/stamp.jsp?tp=&arnumber=1191531>.*

Srivastava, Amitabh et al., "Vulcan Binary Transformation in a Distributed Environment", Microsoft Research, Apr. 20, 2001, pp. 1-12.

Romer, Ted et al., "Instrumentation and Optimization of Win32/Intel Executables Using Etch", USENIX, Aug. 1997, pp. 1-8.

"Dyninst Programmer's Guide", Release 5.1, Paradyn Parallel Performance, Computer Science Department, Mar. 2007, pp. 1-78.

Hollingsworth, Jeffrey et al., "Dynamic Program Instrumentation for Scalable Performance Tools", May 1994, pp. 1-10.

Cohn, Robert et al., "Spike: An Optimizer for Alpha/NT Executables", USENIX, Aug. 1997, pp. 1-8.

Bruening, Derek L., et al., "Efficient, Transparent, and Comprehensive Runtime Code Manipulation", Massachusetts Institute of Technology, Sep. 2004, pp. 1-306.

De Sutter, Bjorn, et al., "Link-Time Binary Rewriting Techniques for Program Compaction", ACM Transactions on Programming Languages and Systems, vol. 27, No. 5, Sep. 2005, pp. 882-945.

De Sutter, Bjorn, et al., "Link-Time Compaction and Optimization of ARM Executables", ACM Transactions on Embedded Computing Systems, vol. 6, No. 1, Article 5, Feb. 2007, pp. 1-43.

Eustace, Alan et al., "ATOM: A Flexible Interface for Building High Performance Program Analysis Tools", WRL Technical Note TN-44, Jul. 1994, pp. 1-22.

Hiser, Jason D., et al., "Evaluating Indirect Branch Handling Mechanisms in Software Dynamic Translation Systems", 2007, pp. 1-13.

Luk, Chi-Keung, et al., "Pin: Building Customized Program Analysis Tools with Dynamic Instrumentation", Proceedings of the 2005 ACM SIGPLAN conference on Programming Language Design and Implementation, vol. 40, 2005, pp. 190-200.

Muth, Robert et al., "Alto: A Link-Time Optimizer for the Compaq Alpha*", Software-Practice and Experience, 31, Nov. 2, 2010, pp. 67-101.

Nanda, Susanta, et al., "BIRD: Binary Interpretation using Runtime Disassembly", Proceedings of the International Symposium on Code Generation and Optimization, 2006, pp. 358-370.

Nethercote, Nicholas et al., "Valgring: A Framework for Heavy-weight Dynamic Binary Instrumentation", SIGPLAN Not., 42, 2007, pp. 89-100.

Schwarz, Benjamin William, "Post Link-Time Optimization on the Intel IA-32 Architecture", PhD Thesis, University of Arizona, May 2002, pp. 1-45.

Schwarz, Benjamin et al., "PLTO: A Link-time Optimizer for the Intel IA-32 Architecture", In Proceedings 2001 Workshop on Binary Translation, Sep. 2001, pp. 1-7.

Scott, K., et al., "Retargetable and Reconfigurable Software Dynamic Translation", In Proceedings of the International Symposium on Code Generation and Optimization: Feedback-Directed and Runtime Optimization, 2003, pp. 36-47.

Srivastava, Amitabh et al., "A Practical System for Intermodule Code Optimization at Link-Time", WRL Research Report, Journal of Programming Languages, Dec. 1992, pp. 1-29.

Chanet, Dominique et al., "Diablo: A Reliable, Retargetable and Extensible Link-Time Rewriter", In Proceedings of the 2005 IEEE International Symposium on Signal Processing and Information Technology, Dec. 2005, pp. 1-42.

Hex-Rays, Hex-Rays Decompiler: Overview, Copyright (c) 2011, Retrieved on Nov. 2, 2012, http://www.hex-rays.com/products/decompiler/index.shtml, 2 pages.

* cited by examiner

Figure 1: Flow diagram of an infrastructure for binary rewriting.

Figure 2: Code layout and decision flow for binary rewriting.

BINARY REWRITING WITHOUT RELOCATION INFORMATION

CROSS REFERENCE TO RELATED APPLICATIONS

This application claims priority under 35 U.S.C. §119(e) of U.S. Provisional Patent Application Ser. No. 61/182,551, filed on May 29, 2009. The subject matter of the earlier filed application is hereby incorporated by reference in its entirety.

BACKGROUND

1. Field

Binary rewriters that do not require relocation information may be relevant to the field of computing. Specifically, such binary rewriters may improve both the functional structure of computer programs and the physical structure of their recording media in a variety of ways.

2. Description of the Related Art

Binary rewriters are tools, often implemented using software running on hardware, that accept a binary executable program as input, and produce an improved executable as output. The output executable usually has the same functionality as the input, but is improved in one or more metrics, such as run-time, energy use, memory use, security, or reliability.

Binary rewriting is valuable even for highly optimized binaries produced by the best industrial-strength compilers. The reasons for this value include the following. Although compilers can in theory do whole-program optimizations, most compile each procedure separately. Moreover, research in whole-program optimization has been focused on a few domains and is limited in general. Binary rewriters have demonstrated inter-procedural optimizations that deliver improvements even on highly optimized binaries. Also, it may be more economically feasible to implement a transformation once in a binary rewriter, rather than repeatedly in each of the many compilers for an instruction set. Additionally, unlike compiler-implemented technology, when a code transformation is implemented in a binary rewriter, it may be applicable to code produced from any programming language, including assembly code, with no additional effort. Finally, binary rewriters can be used to enforce security rules on to-be-executed code. A compiler may not serve to enforce security, since the developer may, maliciously or otherwise, simply not use a compiler with security enforcement.

However the reality is that binary rewriters are not in wide commercial use today. One reason is that conventional binary rewriters are unable to rewrite binaries that have no relocation information. Static, or off-line, rewriters are discussed here, while dynamic, or run-time, rewriters are discussed later. Linkers typically discard relocation information. Indeed, virtually all commercial binaries lack relocation information. Consequently, they cannot be rewritten by existing static rewriters. Instead, developers can rewrite their own binaries by specially generating binaries produced by instructing the linker to retain relocation information. Linkers typically discard relocation and symbolic information because it is not needed for execution, and further, software vendors do not want this information to be revealed for their programs, since it makes it easier to understand and reverse-engineer their products.

Binary rewriting has many applications including inter-procedural optimization, code compaction, security-policy enforcement, preventing control-flow attacks, cache optimization, software caching, and distributed virtual machines for networked computers. Many other code optimizations not listed here are also possible.

The reason for the great interest in research in binary rewriting is that it offers many features that are not conventionally available with compiler-produced optimized binaries. For example, binary rewriters can have the ability to do inter-procedural optimization. Many existing commercial and open-source compilers use separate compilation, i.e., they compile each procedure separately and independently from other procedures. The reason for this separate processing is that programs are typically distributed among several files, and to keep compile times low in the typical repeated debug-recompile cycle during development, it is important to only recompile files that have changed since the last compile. Thus, files are compiled separately. To maintain correctness for functions called across files, this usually implies that functions must also be compiled separately. For example, this is the case with GCC, the most widely used open-source compiler used commercially, even with the highest level of optimization.

In contrast, binary rewriters have access to the entire program, not just one procedure at a time. Hence, unlike in a separate compiler, inter-procedural optimizations become possible.

Another difference between binary rewriters and compilers is increased economic feasibility. It is more economically feasible to implement a code transformation once for an instruction set in a binary rewriter, rather than repeatedly for each compiler for the instruction set. For example, the ARM instruction set has over thirty compilers available for it, and the x86 has a similarly large number of compilers from different vendors and for different source languages. The high expense of repeated compiler implementation often cannot be supported by a small fraction of the demand.

Furthermore, binary compilers can work for code produced from any source language using any compiler. A binary rewriter works for code produced from any source language by any compiler.

Additionally, binary compilers can work for hand-coded assembly routines. Code transformations cannot be applied by a compiler to hand-coded assembly routines, since they are never compiled. In contrast, a binary rewriter can transform such routines.

Consequent to these advantages, a number of binary rewriters, disassemblers and object-code rewriters have been built, mostly in academia. These include IDA, Objdump, Etch, Squeeze and Squeeze++, DynInst, OM, ATOM, ALTO, PLTO, Spike, and Diablo.

They are at least two types of binary rewriters: static and dynamic. A conventional static binary rewriter rewrites the binary off-line, but requires relocation (and usually symbolic) information. A conventional dynamic binary rewriter rewrites the binary during its execution, and consequently does not need relocation or symbolic information.

Conventional static binary rewriters need relocation information to be able to distinguish code from data, since rewriting any data that might be buried inside the code section could break correctness. Binaries often contain data in the middle of code. Examples of such data include jump tables, literals, literal tables, alignment bytes, and junk bytes. Relocation and symbolic information can help identify most or all of these data locations, allowing for correct rewriting in most cases. Conventional static rewriters also need relocation information to update indirect branch addresses in light of the target address being moved because of rewriting.

An advantage of dynamic rewriters is that dynamic rewriters do not need relocation information, since at run-time there is no problem distinguishing code from data Consequently, code can be rewritten only when it is about to be executed, at which point it is known to be surely code. Indirect branch addresses may also be known at run-time.

Dynamic binary rewriters conventionally impose the combined overheads of analysis and rewriting at run-time. Thus, conventionally they have been deemed suitable only for simple program transformations, such as instrumentation or localized optimizations. More complex code transformations, such as automatic parallelization, memory management, and inter-procedural optimizations are not deemed to be feasible in a conventional binary rewriter at least because their dynamic compilation overheads would be prohibitive. Moreover, typically only one basic block is rewritten at a time, further limiting the types of possible optimizations. Finally, dynamic rewriters have high run-time overheads even when the application is not rewritten at all, since most dynamic rewriters intercept the applications execution at most indirect branches. Nevertheless, dynamic rewriters have seen some commercial success, such as in the use of Dynamo-RIO by Determina® Inc. (subsequently purchased by VMWare®) for its security checks on control-flow.

Existing dynamic binary rewriters are not used to rewrite a binary file into a rewritten binary file that works for all input data sets for the binary. Instead existing dynamic rewriters rewrite code discovered for a particular input data set to main memory. This rewritten code in main memory may not be complete, since with a different data set the program may discover new code that was not discovered with an earlier data set. Thus, because a dynamic binary rewriter is not a static binary rewriter, the dynamic binary rewriter is not designed to rewrite programs off-line without having access to any data set, and is not designed to provide an output binary that is configured to work for all input data sets. Indeed, existing dynamic rewriters cannot provide such an output binary file.

SUMMARY

In certain embodiments, the present invention is a method. The method can include processing a binary file as an original binary file. The method also can include disassembling the binary file to provide a disassembled binary file. The method further can include rewriting the disassembled binary file without relocation information to provide a rewritten binary file. The rewriting can provide a physical transformation in a recording medium relative to the binary file in the recording medium prior to the rewriting. The processing the binary file, disassembling the binary file, and rewriting the disassembled binary file can be performed by a particular machine.

The present invention, according to certain embodiments, is a computer-readable medium encoded with instructions that, when executed in hardware, perform a process. The process can include processing a binary file as an original binary file. The process can also include disassembling the binary file to provide a disassembled binary file. The process can further include rewriting the disassembled binary file without relocation information to provide a rewritten binary file. The rewriting can provide a physical transformation in a recording medium relative to the binary file in the recording medium prior to the rewriting. The processing the binary file, disassembling the binary file, and rewriting the disassembled binary file can be performed by the hardware.

In other embodiments, the present invention is an apparatus including a processor configured to process a binary file as an original binary file. The apparatus can also include a disassembler configured to disassemble the binary file to provide a disassembled binary file. The apparatus can further include a rewriter configured to rewrite the disassembled binary file without relocation information to provide a rewritten binary file. Rewriting preformed by the rewriter can provide a physical transformation in a recording medium relative to the binary file in the recording medium prior to the rewriting.

The present invention, according to other embodiments, is an apparatus including processing means for processing a binary file as an original binary file. The apparatus can also include disassembling means for disassembling the binary file to provide a disassembled binary file. The apparatus can further include rewriting means for rewriting the disassembled binary file without relocation information to provide a rewritten binary file. The rewriting can provide a physical transformation in a recording medium relative to the binary file in the recording medium prior to the rewriting.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
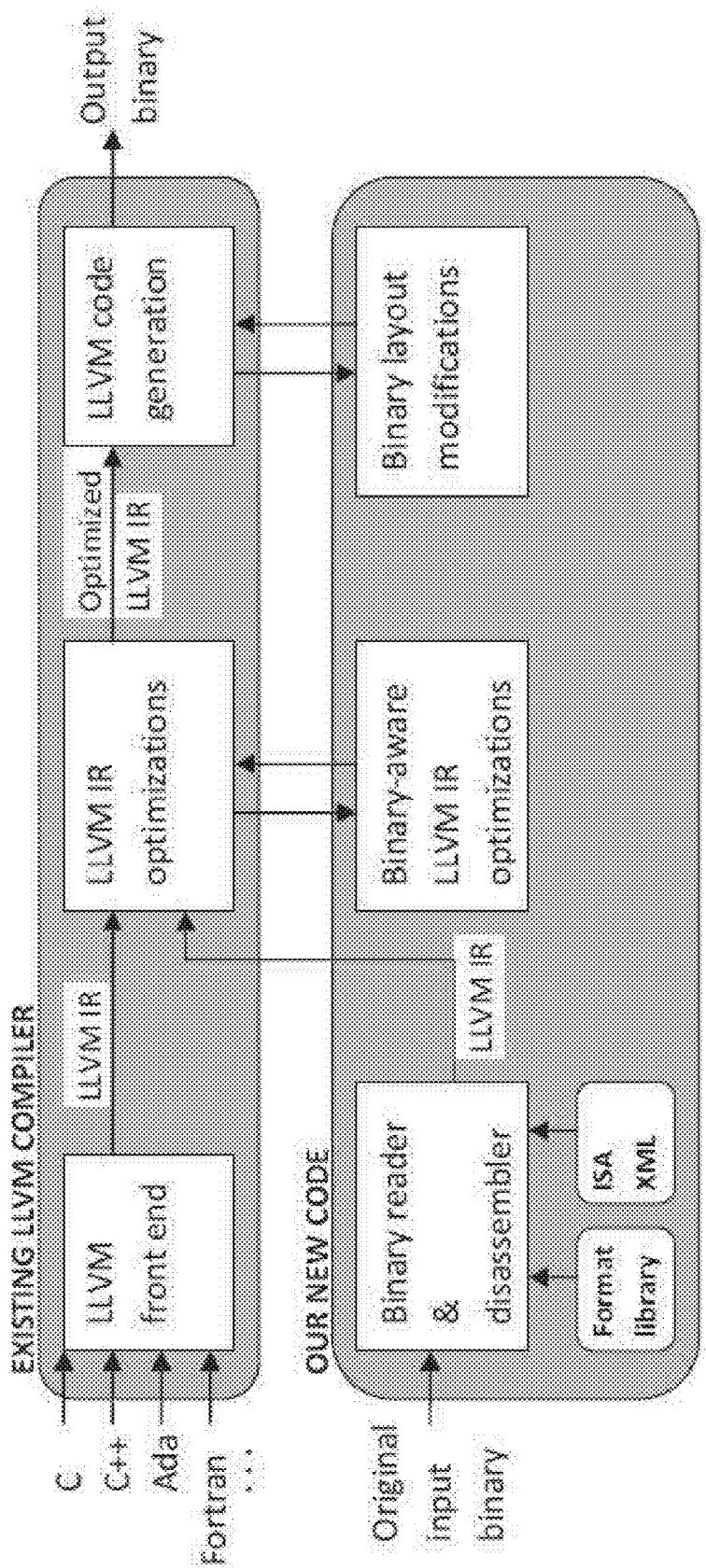
FIG. 1 illustrates an internal flow of certain embodiments of a binary rewriting software infrastructure.

Certain embodiments of the present invention relate to a binary rewriter and binary rewriting infrastructure that can rewrite binaries that do not contain relocation information. Hence an arbitrary binary, produced by any compiler, even containing hand-coded assembly, may be rewritten by anyone using certain embodiments of the method, techniques, systems, and binary rewriters discussed in this document. End-users, therefore, may be able to rewrite any binary they wish to execute. Certain embodiments of the binary rewriting approaches discussed have several additional desirable features besides not needing relocation information. For example, certain embodiments have the ability to rewrite 100% of the code, whereas existing binary rewriters can rewrite only the portion of the code section that they can prove is code, which is virtually always less than 100% in practice. Certain embodiments have the ability to rewrite legacy code with no source, whereas existing binary rewriters cannot rewrite these. Additionally, certain embodiments of the binary rewriter can be used on arbitrary binaries for security enforcement that cannot be circumvented, unlike existing binary rewriters, which cannot rewrite most commercial binaries. Furthermore, certain embodiments can rewrite obfuscated binary code correctly, even though conventional rewriting techniques are not able to address such code. Obfuscation is a scheme designed to make it harder to correctly disassemble programs. Certain embodiments, moreover, may be useful in synergistic projects as will be discussed below.

Certain embodiments of the present invention identify and address the issue of missing relocation information. Additionally, certain embodiments of the present invention can translate the target of indirect control-transfers correctly without relocation information. Furthermore, certain embodiments speculatively disassemble and rewrite 100% of the code section, even when parts may be data or cannot be proven to be code, while maintaining the original code image in the binary. Moreover, certain embodiments provide an innovative layout of the output code that permits the output code to perform in an enhanced way compared to the original binary.

Additionally, certain embodiments of the present invention may permit a non-expert end user to rewrite any arbitrary binary to improve the performance, security, or memory consumption of the binary, or to monitor its resource consumption. These improvements in those applications may boost the productivity and security of their users. Additionally, certain embodiments may provide a high-quality infrastructure that can be built upon to provide further applications, as well as to provide a strong educational program with instructional and outreach components.

In contrast to some of the conventional approaches, a static approach according to certain embodiments of the present invention has zero run-time overhead when no code is changed, and adds negligible run-time overhead even when code is changed. Thus, certain embodiments of a static binary rewriter may have the following benefits.

Certain embodiments of the present invention do not require relocation information. Conventional binary rewriters require relocation information, but most commercial binaries lack this information. As a result, a person wishing to rewrite conventionally would need access to the object files, which need to be re-linked to produce binaries with relocation information. In contrast certain embodiments of the present rewriter can be applied by anyone to any binary executable.

Certain embodiments of the present invention can be applied to legacy applications. Legacy binaries cannot be rewritten by conventional binary rewriters since virtually all binaries lack relocation information. Moreover recompilation from source may often not be possible since source code is often not easily available for legacy code. Certain embodiments of the present rewriter can rewrite legacy binaries without relocation information and without source code.

Certain embodiments of the present invention can rewrite 100% of the binary code. Conventional rewriters, even with relocation information, cannot rewrite 100% of a binary's code, since they can only rewrite what they can prove is code. The difficulty is that data may be buried in the code section, which if rewritten, can break the program. Hence conventional rewriters must be conservative if they cannot prove that a portion of the binary is code, and not rewrite it. Certain embodiments of the present invention provide an innovative scheme that speculatively disassembles and rewrites all code section blocks that could not be proven to be code (called non-disassembled code), but also keeps an original copy of the binary in case portions are data. At the cost of some code size increase (but almost no run-time increase), this scheme can permit rewriting 100% of the binary.

Certain embodiments of the present invention can be used to enforce security on untrusted code. Since conventional static binary rewriters generally require developer cooperation, it is not feasible to use them to enforce security properties on code from untrusted developers. This is because an untrusted developer may simply not provide relocation information, leaving the user unable to rewrite the binary. However, with certain embodiments of the present technology, any end-user of a program can apply binary rewriting to enforce security on any code, including untrusted code. Furthermore, the same principle can be applied by a software distributer who receives applications for distribution from third party developers and wishes to carefully scrutinize the applications for security or other reasons prior to releasing them for distribution. This cannot be avoided by a malicious developer. Moreover since 100% of the binary's code can be rewritten, an attacker cannot hide malicious code in binaries by making it appear like it might be data to avoid rewriting.

Certain embodiments of the present invention can rewrite obfuscated binaries. Obfuscation is a technique sometimes used to mislead attempts to reverse-engineer the code, primarily by making it appear that code is data or vice versa. Obfuscation is commonly used for high-level representations such as Java™ bytecode and Microsoft®'s MSIL, since they are close to source. Existing binary rewriters cannot rewrite obfuscated binaries correctly. Certain embodiments of the present invention provide an innovative method that correctly rewrites obfuscated code. This feature future protects certain embodiments of the present method against possible obfuscator use.

Certain embodiments of the present binary rewriter can leverages the low level virtual machine (LLVM) compiler infrastructure to rewrite x86 (both 32- and 64-bit) and Advanced reduced instruction set computing (RISC) Machines (ARM®) binaries.

Existing uses of binary rewriting are many and varied as mentioned before: inter-procedural optimization, code compaction, security-policy enforcement, preventing control flow attacks, cache optimization, software caching, and distributed virtual machines for networked computers, just to mention a few. Future uses are also expected to benefit from the ability of certain embodiments of the present technology to rewrite arbitrary executables without relocation information.

In addition, binary rewriting using certain embodiments of the present invention may be of use in automatic parallelization. By the use of certain embodiments of the present rewriter the same automatic parallelization routines may be built to work seamlessly on LLVM IR, regardless of whether it came from source code or binaries. Modifications to existing parallelization approaches to make them applicable to binary code may be employed, such as those set forth in U.S. patent application Ser. No. 12/771,460, filed Apr. 30, 2010, which is hereby incorporated herein by reference in its entirety.

Security enforcement may also employ a binary rewriter according to certain embodiments of the present invention. A method can, for example, instrument potentially untrusted binaries with security checks at every system call in the code. The approach can thus provide confidentiality, integrity, and assurance, defending against a wide range of attacks such as denial-of-service attacks, unauthorized data access, and unauthorized resource manipulation. An existing way to enforce security is auditing, an operating system (OS)-based solution in which audit logs of system calls are checked periodically for security violations using interrupts. Such methods can incur significant overhead from the interrupts. Furthermore, they may be able to detect attacks only after the attacks have succeeded, and hence cannot prevent attacks. A binary rewriting approach can prevent attacks before they can succeed by inserting checks before the system calls. Other methods to secure binaries are also possible.

Certain embodiments of the present invention may assist in managing memory allocation for scratch-pad memory. Certain embodiments may be able to allocate code and data objects in binary programs automatically to Scratch-Pad Memory (SPM). SPM is a form of fast compiler-controlled static random access memory (SRAM) in embedded systems. Compiler methods are conventionally used to perform SPM allocation, but binary rewriting methods may be portable to any compiler and may be more economically feasible, since they can be implemented once rather than repeatedly in different compilers. Additionally, binary rewriting approaches may be applicable to assembly code, may provide executables that are portable to any SPM size; and may be more easily adapted to multi-tasked environments when doing SPM allocation.

Inter-procedural optimizations can be performed, as noted above, using a binary rewriter. A binary rewriter may have access to the entire program, and consequently can perform inter-procedural optimizations.

Before describing certain embodiments of the present technology in other relations, an example software infrastructure will be described. It is important to note that certain embodiments of the present technologies described herein will apply to any type of binary rewriter, not just the infrastructure that is set forth specifically herein. Nevertheless, certain embodiments of the present infrastructure can be examined, by way of illustration.

Certain embodiments of the present infrastructure may be powerful enough for complete re-compilation rather than just instrumentation or localized optimization. Many binary rewriters attempt to limit disturbance to the original binary as much as possible. However, this approach is too limited for certain far-reaching optimizations, such as automatic parallelization. An approach according to certain embodiments can convert a binary into a high-level intermediate representation (IR) that the LLVM compiler can use. LLVM is an open-source compiler from the University of Illinois that has been adopted by Apple® Corporation for industrial-strength maintenance and growth. Once the binary is converted to LLVM IR, it can be recompiled, which means instruction selection, register allocation, and a standard suite of optimizations can be re-applied.

Benefits of recompilation are that it allows for maximum flexibility in terms of rewriting transformations possible, and it provides the potential to catch any optimizations that might have been missed by the compiler that produced the original binary.

FIG. 1 shows an internal flow of certain embodiments of the present LLVM-based binary rewriting software infrastructure. LLVM is just one example of a compiler—other compilers can be substituted for it. The figure shows that certain embodiments of the present infrastructure has two components: an LLVM source-code compiler (shown on top), and the new code for binary rewriting that leverages LLVM (shown below). As the figure shows, the LLVM compiler may be a traditional source-code compiler that accepts a variety of languages at its front end, and which converts them to a common language- and architecture-independent IR. The IR code can thereafter be optimized by LLVM's existing optimizations, and then code can be generated for a variety of target architectures, including x86 and ARM®.

As shown in the lower half of the figure, LLVM can be leveraged for binary rewriting by building a new binary reader that converts the input binary into LLVM IR. The binary reader can use a format library that describes the format of commonly used executable file formats such as PE and ELF. The reader can also use an instruction set architecture (ISA) description file written in extensible markup language (XML) to describe the list of machine instructions and their formats. The IR produced by the binary reader is of the same format as IR from source-code, but is different from it, in that it lacks symbolic information. Producing good IR code from a binary requires much static analysis, which can be performed.

The IR produced from the binary can be optimized using not only standard LLVM optimizations, but also any new optimizations and transformations that certain embodiments of the present binary rewriter introduces, as shown and discussed herein. Code generation can be run on the resulting optimized IR to output rewritten binary code in the same instruction set as the input. FIG. 1 may make it appear that certain embodiments of the present infrastructure can be used for translating code in one instruction set architecture (ISA) to another. This may be possible, but cross-ISA translation may be quite computationally intensive for a variety of reasons related to the difference between ISAs.

The technologies according to certain embodiments of the present invention may require several binary layout modifications (as shown) to the code generation phase. Producing the output binary from the IR may complete the binary rewriting.

Before describing how binaries can be modified without relocation information, it may be useful to understand how existing binary rewriters modify binaries, and why they rely on relocation information. When binaries are rewritten, instructions may be inserted, deleted or modified. Instruction deletion or insertion may change the relative offsets between instructions, as well as between instructions and data objects embedded in the code section. To maintain correctness, the binary rewriter ensures that the targets of all control-transfer instructions are adjusted to account for the changed location of the target. It also ensures that the effective addresses of all memory instructions that may access data in the code section have been adjusted to account for the moved location of that data element. Maintaining correct addressing in the presence of moved instructions and data is viewed as one way to maintain correctness of binary rewriting.

Considering the situation of maintaining correct targets of control-transfer instructions, for direct control-transfer instructions whose targets are specified as program counter (PC)-relative immediates, the target instruction can be calculated by the rewriter as a constant. Thus, the new location of that code address can be easily derived by keeping track of where instructions have been added or deleted. However, indirect control-transfer instructions whose targets are in registers pose different issues. In some cases, existing binary rewriters can prove using dataflow analysis that the value of the target register is a constant. In such cases, the instructions that assign the register to a constant address can be modified to use the moved equivalent of that address.

Nevertheless, some control-transfers remain whose register-indirect targets cannot be proven to be a constant, or a set of constants, by dataflow analysis. These branches have targets that might have moved in rewriting. Not knowing their target makes it impossible to adjust it for the motion. It is such branches that cause the reliance of existing binary rewriters on relocation information.

To see how relocation information is used to address the issue of unknown or uncertain targets, consider what relocation information is. Relocation information can be provided as a list of all address calculation instructions whose address arguments need to change when multiple object files are linked together into one executable. The address calculation instructions for the unknown-target control transfer are conventionally in the relocation list since its address argument would need to be updated upon linking. Hence updating each address argument in the relocation list by its movement in the binary rewriter maintains correctness. Without this relocation list, traditional rewriters cannot maintain correctness, and thus fail.

Although the above discussion focuses on code movement for ease of understanding, very similar problems arise when data movement is attempted, which can be similarly addressed with relocation information.

It might at first appear that it would be impossible to statically rewrite a binary without relocation information. After all, if even a single branch in the program has an unknown target, it could branch to anywhere. Thus, no instruction could be safely moved from its current location. If that were so, it would appear to prevent rewriting altogether. This has been the conventional wisdom for decades, preventing the promise of binary rewriting from transforming itself to a practical, widely-used commercial reality.

Methods that permit arbitrary binaries to be statically rewritten are presented below. It may be appropriate that functions have been detected in the binary before these methods are applied, and a section on disassembly below explains how this may be done, although there is no requirement that all the functions be recognized for the method to work correctly. Statically rewriting the binary without relocation information can be accomplished, keeping in mind certain understandings regarding the input binary and an innovative approach to static binary modification. Certain embodiments of the present approach can guarantee correctness and can optimize performance at the expense of a larger final code size.

Direct branches, calls, and data references are relatively easy to handle, and can be handled the same way as in existing rewriters. For a direct branch, the branch target can be PC-relative or absolute. In either case, the target may move around as the binary is optimized, instrumented, and recompiled into a new form.

To keep track of these changes, these references can be translated into symbolic references in an intermediate representation (IR). Thus, pointers to data structures can be used between references and their targets. At the time of code generation, these pointers can be translated back into the appropriate offsets. Indeed, this is how direct branches can be represented in IR from source-code, so this method for binaries is analogous and straightforward. This same technique can be applied to direct calls and constant-address references to data within the code section.

For some indirect branches (and jumps), dataflow analysis can be used to identify the target as a constant (or a set of constants) which can be easily rewritten for correctness. These resolved indirect branches can, thereafter, be handled like direct references. Other indirect branches can be recognized as returns by static return analysis. Returns pose no problem, however, since their return address is run-time determined and does not need to be statically adjusted. However, in some cases, static analysis may be unable to determine or resolve the value of the branch target. These cases can be provisionally referred to as unresolved indirect branches.

Unresolved indirect branches can be further treated, since their target could move, which would appear to cause the branch to become invalid. Further, since the branch is unresolved, it would not be clear what it targets at static rewriting time, making it impossible to use an IR pointer for the target, unlike in the direct reference case. The reason that it would not be possible to use an IR pointer is that we would not know what to point to statically. Without further action, the target addresses may be calculated as their original unmoved values, which would be wrong. Existing rewriters attempt to handle such unresolved indirect branches by relying on relocation information to update all branch address creation points in the binary to point to the moved address. The branch address creation points may be listed in the relocation information.

Certain embodiments of the present approach for unresolved branches and jumps, but not calls, is to provide a branch translation table for all possible targets of the unresolved branch, rather than using relocation information. Calls may be handled by a different method described later. The table can store, for every byte address in the function, a new offset of that target after rewriting. The table may be indexed by the difference of the branch target address from the function's start address. The table may be populated statically at rewriting time, but indexed for each unresolved branch at run-time to translate the original target to the rewritten target. In this way, the branch targets may correctly track moved instructions. Because the branch could potentially jump to any instruction within the function, certain embodiments of the present table might be proportional in size to the original function, which could be considerably large. However, this overhead may be manageable, given the following conditions.

Indirect branches may not be able to cross function boundaries. If this is the case, the translation cases can be limited to handle only targets within the current function. Of course, calls do cross function boundaries, but they will be handled differently later in this discussion. This condition should always be valid in compiled code, as there appear to be no compiler transformations that would produce a code in which indirect branches cross function boundaries. Even for hand-coded assembly, it is hard to imagine what the intended semantic of a branch, not a call, to another function would be. For example, the function's return would be expected to behave in an undefined manner if the function had no calling point.

Additionally, in a typical program, a majority of functions are small in size. For small functions, the original and new addresses will only have a small difference. To save space, this difference, rather than the full new address, can be stored at each original address index. Hence, for most functions, one or perhaps two bytes may store the small difference for each translation entry.

Functions with no unresolved branches may not require a branch translation table. If a constant target can be found, then a branch translation would not be needed. Hence it is reasonable to expect that for a significant number of functions, no branch translation table will be needed.

Additionally, tables can be reused. For functions with multiple unresolved indirect branches, the same branch translation table can be reused.

Despite the observations above, the code size overhead may be substantial for some programs. In some cases, the overhead code size may be proportional to the size of the original code section in the binary. Code-size overhead is discussed more fully 3 below.

The run-time overhead of the translation tables may be very low or negligible, because the translation tables may be referenced only for the very small portion of dynamic branches that are both indirect and unresolved. Counting dynamically, most branch invocations are at the end of loops, which are almost always direct branches. Most remaining branches can be resolved as well. For each such dynamic instance of an indirect and unresolved branch, the run-time may increase by 1-2 cycles for a memory reference to the translation table, likely a cache hit for branches in loops. The result may be a near-negligible run-time overhead.

Although the above discussion implements a branch translator using a branch translation table in one embodiment, a branch translator may be implemented in other embodiments using other translation mechanisms. In general, any method or apparatus that takes an instruction address in the input binary as input, and provides the address of the equivalent rewritten instruction in the rewritten binary as output, may be used in place of a branch translation table. Such alternative implementations may include, but are not limited to, data structures such as hash tables, height-balanced or other search trees, or heaps.

Thus, rewriting direct references of all kinds and all indirect branches have been discussed. What remains is to discuss indirect calls and other call-related issues.

Like unresolved indirect branches, unresolved indirect calls also pose a challenge. Existing rewriters use relocation information to update call address creation points. However, without relocation information, the addresses of unresolved indirect calls cannot be updated statically in the code. Thus, run-time translation may be needed. A call translation table can translate the start address of every function in the original binary to the start address of that same function in the rewritten binary. Proportional in size to the number of functions in the original binary, the translation table can be populated statically but can be indexed at run-time by the unresolved indirect call's target address. The call can then be made to the new address fetched from the table, ensuring correct execution. Various data structures can be used for the call translation table. A hash table is one example. The run-time overhead of the call translation table may be very small, because most calls are direct calls, and because many indirect calls may be resolved to a set of constant call addresses.

Although the above discussion implements a call translator using a call translation table in one embodiment, a call translator may be implemented in other embodiments using other translation mechanisms. In general, any method or apparatus that takes an instruction address in the input binary as input, and provides the address of the equivalent rewritten instruction in the rewritten binary as output, may be used in place of a call translation table. Such alternative implementations may include, but are not limited to, data structures such as hash tables, height-balanced or other search trees, or heaps.

The above solution may need to be slightly modified to address one additional situation, which may be a rare situation. The situation that is to be addressed is the situation in which a function has more than one entry point, not just the start of the function. Such a situation is possible in rare cases in handwritten assembly code. To address this situation, a copy of the original unmodified code section can be included in the binary. This is not the only reason to retain the original code, as will be explained later. Certain embodiments of the present rewritten executable can be appended to the existing code section. In the rare case that a call's target address is not found in the call translation table, the address is not translated, and the function is executed from the original code copy. This case can exist when the target address of the call is the middle of a function, rather than its start. That means that the optimized rewritten function will not be executed, but rather the original function will be. This situation, however, may be very rare. Moreover execution will return to the new code once the function returns.

Certain embodiments of the present method apply to instruction sets where it may be difficult to distinguish a call from a branch. This may happen when the program counter (PC) is a program-visible register, such as in ARM; thus a call can be simulated by saving the PC explicitly, followed by a branch instruction. When possible, such cases can be detected statically. Nevertheless, not all cases may be detectable in certain embodiments, so certain embodiments of the present method may be modified to address such architectures. The method may include first checking the branch translation table. If the target is not found there, the techniques above for calls may be employed, checking the call translation table. In this way, branches which are really calls will be handled correctly as calls.

The way of handling calls to the middle of functions may come at the significant code-size cost of keeping an image of the original binary in the new binary. Thus, certain embodiments of the present complete method may result in an increase of the code size by two or three times. This cost may be significant, but may be viewed as necessary and acceptable. Keeping the original code image addresses several situations: it allows calls to the middle of functions to work; it maintains the addresses of data objects embedded in the code segment unchanged, keeping their references correct; and it allows for 100% of the binary to be rewritten using the novel speculative approach that will be discussed at greater length below. This code growth in memory is similar to that of dynamic binary rewriters and Java virtual machines for that matter, which sometimes keep the original and rewritten code blocks in memory.

However, in a resource-rich multi-core architecture or similar architectures, code size may not be the most important criteria. For example, run-time may be much more important, and run-time may be improved by certain embodiments of the present invention. For example, an automatic parallelizer that improves run-time by increasing code-size may be considered a good bargain, particularly if memory for storing the code is plentiful.

Keeping the copy of the original code in the rewritten binary may also ensure correctness with callbacks of functions from outside the program. Consider the case where it appears as if the binary is passing a function pointer as a parameter to a library or system call. This might be done to register the function as a callback or as an interrupt handler. This is difficult, perhaps impossible, to detect statically. In this situation the parameter can be left untranslated and the program can fall back onto the copy of the original code section. This may ensure that correctness is maintained in the case that this parameter was, in fact, not a function pointer, even though it might have appeared to be one.

Function redirection may be another important issue. There are at least two cases, callbacks and calls to the middle of functions, where, to guarantee correctness, control flow may be returned to the original copy of the code section. Having accepted this, it would be nice control could then be re-transferred back to the optimized, rewritten binary, as soon as possible.

For those functions that have been definitively classified during disassembly, the first instruction can be replaced with a jump to the location of the rewritten copy of the function. If the first instruction is not large enough to contain the jump, it can be replaced with a software interrupt instruction, as is done in binary instrumentation tools like DynInst. The interrupt can permit control flow to jump to an interrupt handler that can then perform the control flow transfer to the rewritten copy at runtime. Thus, if control flow is ever directed to the original copy of a function, it can immediately, or as soon as possible, return to the rewritten copy. Only the first instruction of each definitively known function may be rewritten. The rest of the instructions and/or data may be kept unchanged to support the earlier-mentioned case of calls to the middle of functions.

Like instructions, which can move during rewriting, causing branches and calls to become invalid, data objects can also move, causing data references to become invalid. Unresolved indirect data references are the primary concern here, since direct data references have been addressed above, and indirect data references whose addressed location can be resolved to be a constant can be treated like direct references. Existing rewriters handle data movement by relying on relocation information to list all the address creation points for data references, which can be updated statically upon movement.

To see how unresolved indirect data references can be handled without relocation information, consider that the objects they reference may be in the global, stack, heap, or code segments. Code segment references may be possible for data references, since data may be buried inside the code segment. Correctness for code segment references may be maintained as a result of the decision to maintain an image of the unchanged code segment at an unchanged offset in the binary. Rewritten code may be stored later in the binary's layout. Correctness for global segment references may also be maintained by keeping the global segment at an unchanged location in the binary. Space for any global variables that are optimized away may not be removed. This non-removal may maintain an unchanged layout. Any added global variables may be placed at the end of the binary. Correctness for heap references may be ensured without any changes, since heap objects are run-time allocated. For the aforementioned code, global and heap segment references, the rewriter need not detect or categorize such references, since the layout restrictions may ensure correctness as-is.

Unresolved indirect references to the stack are slightly more complex, since new stack variables cannot easily be added to the end of the stack frame to keep stack offsets constant.

That is because the beginning and end of the stack are typically occupied by incoming and outgoing arguments, neither of which can be moved. Hence any new stack variables may need to be added to the middle of the stack frame. Ideally, any new stack variables can be placed just before the outgoing arguments in the stack frame layout. To place the new stack variables thus, the system may identify the arguments in the stack frame. The stack accesses may be identified by looking at references whose address uses the stack pointer or some register derived from the stack pointer, such as the frame pointer.

Further, incoming and outgoing arguments may be identified as such using dataflow and offset analysis, and may be accessed as explicit arguments in the source-like high intermediate representation (IR) that is used, rather than being accessed as register-based memory references. Once this is done, the proper locations of the new stack variables can be added in the stack frame.

Although the above approach identifies where new stack variables can be added in a stack frame, it may still require stack pointer offsets in stack references to be changed, since the layout of the stack has changed. This is a complex task and might incur run-time overhead. To avoid changing stack offsets, arguments in memory may be effectively removed from the stack frame layout using the approach described above, but the space for those arguments can be kept in the modified frame. That space then can become unused, so a small amount of memory space is wasted, usually at most a few words per function, but keeping the old layout implies the old offsets from the stack pointer variable in the high IR remain unchanged. When the new code is output from the IR, the new argument locations may be added back in extra locations, and the old stack frame may become an object in the new stack frame. These tasks can be accomplished by an existing IR-to-binary-code generator without any further effort by the binary rewriter itself.

The above discussion has shown how to handle code and data that move during rewriting. Anther issue that may arise during rewriting is correctly disassembling the binary. In typical executables there are often data bytes in the code section itself, in between instructions. These data bytes may be introduced for several reasons such as instruction alignment, jump table addresses for compiling switch statements, literal tables in certain architectures like the ARM®, and junk data bytes for padding to ensure alignment. When a disassembler identifies a data byte incorrectly as code, the identification can be considered a false positive. If the purpose of disassembly is comprehension or reverse engineering of the code, then some false positives are tolerable. However, in a binary rewriter false positives are conventionally viewed as unacceptable, since if even a single data byte is incorrectly rewritten based on the assumption that it is an instruction, the program is expected to stop working, except in the harmless case of rewriting junk data bytes.

There are a variety of existing disassembly techniques. Linear sweep forms the basis of many existing disassemblers. It begins disassembly at a known entry point into the code section of a binary. This entry point is provided by common executable file formats such as the Windows® PE format. Certain embodiments of the present rewriter obtain this address by recognizing the OS-supported executable format(s) on the target OS (usually there is only one supported file format). Each instruction can then be decoded in sequence until the end of the section, or until an error occurs. The downside of linear sweep is that it can mistake data for code, such as after an unconditional jump, leading to incorrect rewriting. Thus, it is typically deemed unacceptable by itself for rewriters.

Recursive traversal is similar to linear sweep, but it recognizes control transfers such as branches and calls. When a control transfer instruction is encountered, recursive traversal continues disassembling at all possible successor instructions. In the case of an unconditional branch, disassembly continues at the branch target. For conditional branches, disassembly continues at the target as well as the fall-through instruction.

The benefit of recursive traversal over linear sweep is that it cannot mistakenly disassemble data bytes as code, which could result in incorrect output. However, because it makes no progress in the presence of indirect control transfers, its code coverage is often deemed to be limited. In that sense, it may sacrifice coverage for guaranteed correctness while rewriting.

A variety of techniques employ pattern matching to identify bytes such as the bounds of jump tables or to identify function prologues. Typically, these techniques are architecture- and/or compiler-specific, limiting their usefulness. Also, these techniques cannot guarantee correctness, as a series of data bytes might also fit into the target pattern. Thus, certain embodiments of the present invention may not use such pattern matching techniques.

Another method used to increase percent code coverage is to use a technique known as speculative disassembly. This technique recognizes portions of the code segment that have not been disassembled (non-disassembled code) and assumes that these gaps in the disassembly are most likely the targets of indirect control transfers. Disassembly is then restarted at the beginning of these identified blocks assuming they are code.

If disassembly encounters bit patterns that are not legal instructions, then the disassembler knows that those blocks must have been data and must not be rewritten. However, the opposite is not true, since a block that is actually data may coincidentally also look like legal instructions. Rewriting those blocks may break the code. Hence speculative disassembly may normally be unacceptable for conventional rewriting since it could lead to incorrect code. Consequently, existing rewriters do not use speculative techniques, but pay the price in less than 100% code coverage.

Certain embodiments of the present method of disassembly begin with recursive traversal, supplemented with speculative disassembly. However, contrary to conventional wisdom, certain embodiments of the present rewriting method are able to use speculative code without violating correctness. In certain embodiments of the present method, the rewritten code contains not just one version of the speculative code, but all possible legal disassembly code sequences of any speculatively disassembled code section block. These can be referred to as unknown blocks for brevity, since it is unknown if they are really code or data.

In the case of reduced instruction set computing (RISC) architectures which have fixed-length instructions, there may be only one possible legal disassembly sequence per unknown block, which starts at the first instruction-aligned address within that block. However, for complex instruction set computing (CISC) architectures such as x86, which have variable-length instructions, there could be several legal disassembly sequences corresponding to the different byte offsets chosen for the first instruction. All legal sequences can be stored, since the writer does not initially know during the static rewrite, where the instructions, if present, actually began. For CISC architectures, the number of legal disassembly sequences is upper-bounded by the number of bytes in the longest instruction of the instruction set. In this way, if the unknown block were really code, then its correct disassembly must be present as one of the legal disassembly sequences.

Once all legal disassembly sequences of instructions are stored in the new binary, unresolved branches to their original code counterparts can be translated at run-time to the correct legal sequence using the branch translation method that was described above. In this way, the new speculative code may always be executed when the unknown block was really code, rather than having to rely on the original code. This effectively ensures that 100% of the binary may be safely rewritten in all cases, even with speculative code present. On the other hand, if the unknown block was really data in the code section rather than instructions, then no branches may ever be seen to it. Instead data references, which are not translated, may directly go to the original code image, which was retained as part of the rewritten executable earlier. In this way, unknown or speculative blocks in the code section may be handled correctly regardless of whether they turn out to be really code or data, and yet the system may also rewrite 100% of the code.

Certain embodiments of the present method detect a function in the input binary whenever a call is seen in the binary to the starting instruction address of that function. For direct calls, this function address is apparent from the target operand of the call. For indirect calls, functions may be discovered if alias analysis is optionally run on the binary to find the points-to-set of the call target. Each element of this points-to-set is a function entry point.

The above method may not discover all the functions in the input binary, but the rewriting may remain correct even when not all functions are discovered. When a function is not discovered then its code can be considered a part of the previous function in the code layout. It will typically be expected to be unreachable code since the previous function will return at its end rather than fall-through to the undiscovered function. This unreachable code will be non-disassembled code, which is handled using speculative code like non-disassembled code is always handled by certain embodiments of the present invention, preserving correctness.

Additionally the start of non-disassembled blocks can be speculatively placed in the call translation table. This may be useful since it results in running new code instead of original code when the entered address is really a function. If it is not a function, the method is still correct since adding extra, unused entries in the call translation table is harmless and retains correctness.

Figure 2:
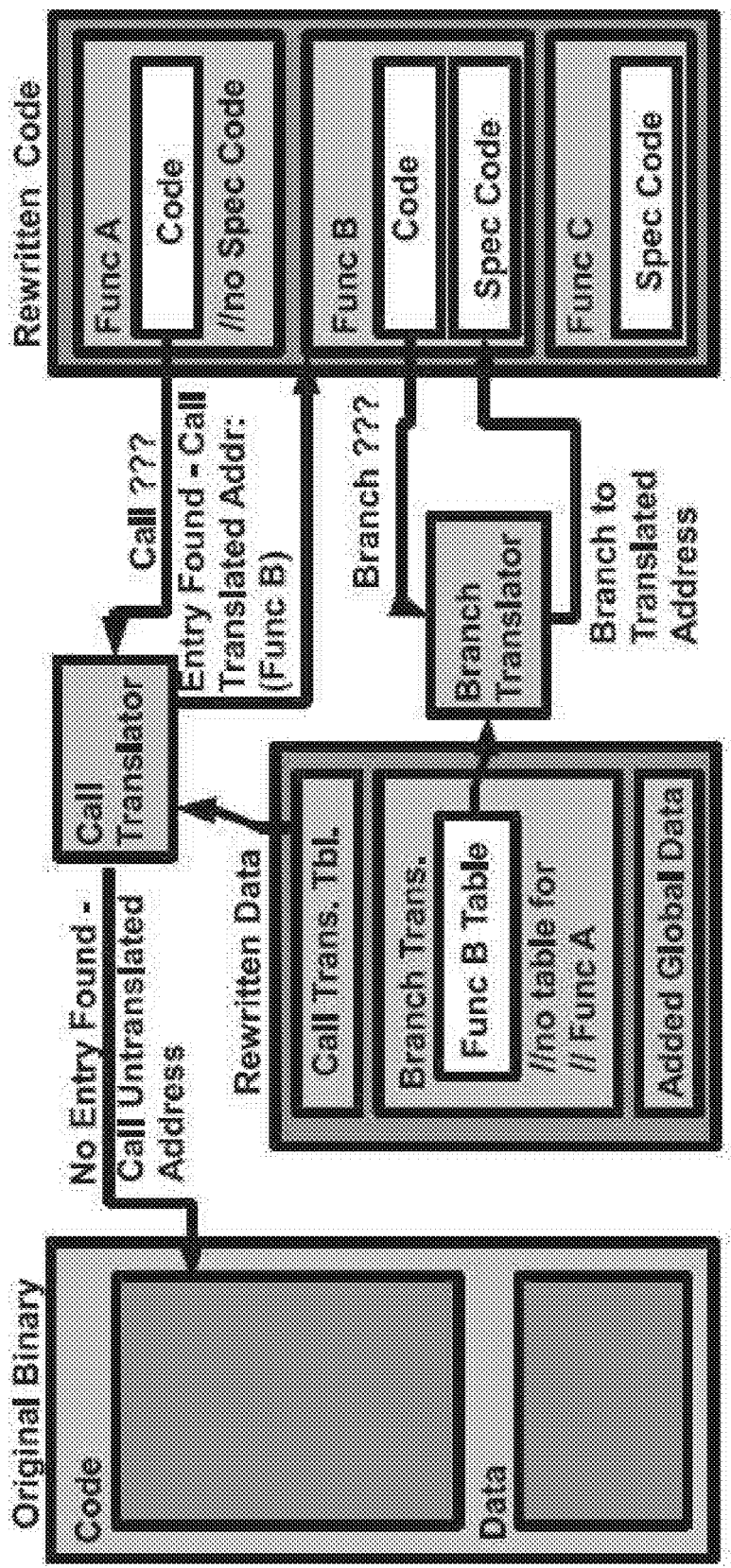
FIG. 2 illustrates a method according to certain embodiments of the present invention.

An illustration of certain embodiments of the present complete method is provided in FIG. 2. FIG. 2 shows the layout of a rewritten binary in three parts: the original binary on the left, the rewritten data in the middle, and the rewritten code on the right. The original binary on the left can be retained as part of the new binary for reasons that were mentioned above. The rewritten code is on the right. As an example, the rewritten code is shown having three functions A, B, and C. In general, a function, like B, may contain some portion proven surely as code, and some portion that is an unknown block that is speculatively disassembled as code, although it may really be either code or data. Other functions may be proven to be fully code, such as A, or may be entirely provided in speculative code, such as C. Finally, in the middle is rewritten data, which is composed of a single call translation table for the program, branch indirection tables for all functions which contain at least one indirect branch, such as B, and any newly added global variables.

FIG. 2 also shows how unresolved indirect branches and calls can be translated at run-time by certain embodiments of the present method. Unresolved indirect branches and jumps can be fed to the box "Branch translator" at run-time, which looks up the branch translation table of the current function to find the translated address to branch to. In the rewritten code, this is implemented as a new load instruction that is inserted prior to the indirect branch which looks up the branch indirection table. Unresolved indirect calls can be fed to the box "Call translator" at run-time, which can look up the translated address and call it. However, if the address is not found in the call translation table, corresponding to a call to the middle of the function, then the original unmodified address can be called in the original binary's image. The call translator can be implemented as a hash table lookup before the call in the binary.

A unique by-product of the way that certain embodiments of the present invention handle speculative disassembly is that, unlike existing binary rewriters, certain embodiments of the present method can work correctly for most types of obfuscated binaries. Obfuscation is a technique that aims to disguise the contents of a program, or make it harder to understand and reverse-engineer. Obfuscation is common for certain interpreted language intermediate forms, as discussed above.

However, obfuscation is largely unnecessary for binaries, since they are generally considered quite hard to understand, even without obfuscation. Hence, most commercial binaries are not obfuscated, allowing certain embodiments of the present binary rewriter to succeed without any additional modifications. Nevertheless, it is interesting to see whether binary rewriters can correctly rewrite obfuscated code.

Existing binary rewriters do not rewrite obfuscated code correctly. To see why, consider that obfuscation techniques can confuse recursive traversal and cause it to generate an incorrect instruction listing. For instance, obfuscators might go to the trouble of inserting conditional jumps where one of the targets is never actually taken at runtime. The obfuscator could then store useful data bytes at the unused target location, which the binary rewriter will incorrectly assume is code and rewrite it, breaking the program.

In contrast, certain embodiments of the present rewriter can work for obfuscation techniques. Consider that obfuscation techniques are generally of two types: to confuse recursive traversal into thinking that data is code, as in the example above, or the opposite, namely to confuse recursive traversal into thinking that code is data. In the first case, where data is confused as code, certain embodiments of the present method works because although this data is incorrectly rewritten assuming it is code, the original code section image containing the unmodified data is maintained. Hence memory accesses to that data still work correctly. The incorrectly rewritten data is simply never run, since it is unreachable, but it causes no harm.

Certain embodiments of the present method also handles the opposite case, namely of obfuscators causing code to be incorrectly treated as possible data. Traditional rewriters will not rewrite this code, which does not break correctness, but reduces the scope of coverage of their method. Certain embodiments of the present rewriter speculatively disassemble and rewrite all non-code blocks just in case they are code. This rewritten code is executed if that block turns out to be indeed code.

This feature of certain embodiments of the present method ensures that no potentially malicious code is hidden in binaries masquerading as data in order to avoid security enforcement. In this way, attackers cannot circumvent certain embodiments of the present enforcement even with obfuscation.

Various methods can improve disassembly coverage. Code coverage can be defined as the percentage of the binary that is proven to be code at rewriting time, given as a percentage of the code section that actually turns out to be code at run-time. Although recursive traversal yields coverage of less than 100%, certain embodiments of the present method, as described above, still allows rewriting of 100% of the code.

Nevertheless, it is useful to improve the code coverage, since code that is definitely known to be code need not have multiple disassembly sequences, saving code size. Further improving coverage improves the quality of dataflow analysis, since incorrect disassembly sequences can insert false data-flow constraints on optimizations. Thus, the following discussion describes methods for improving code coverage.

Constant propagation for indirect transfer targets is a technique to refine control flow proposed by De Sutter et. al. The idea is that for many indirect control transfers, their targets can be derived by constant propagation, a type of dataflow analysis, on the binary code. De Sutter introduced the concept of a hell node in the control-flow graph to deal with unknown control flow edges. All unknown control flow edges are assigned by De Sutter's technique to the hell node. As dataflow analysis is performed, some of these unknown control transfers are revealed to be branches to constant targets. When this happens, edges can be updated to point at their actual targets rather than at the hell node.

Additionally, further techniques can be used to improve recursive traversal's coverage. These techniques may be techniques that have not been used in conventional rewriters.

Constant reaching-definitions analysis is one such technique. In this technique, dataflow analysis is run to derive the set of reaching definitions for the target of each indirect control transfer. For all the reaching definitions that are constant, those constants must represent valid code locations. Hence recursive traversal can continue at all those constant addresses, thus improving code coverage. Further, if all the reaching definitions of the target are constants, then that indirect control-transfer is thereafter considered resolved, in the relevant sense. More sophisticated reaching definitions analysis may be possible using alias analysis which is optionally performed on the input binary on the target of each indirect control transfer.

Memory address analysis is another such technique. In some cases, it is possible to prove that the address of a load and its set of dominating preceding stores are the same. When it succeeds, constant propagation becomes possible from the stores to the loads, improving the effectiveness of constant reaching-definitions analysis above. This can further improve recursive traversal.

Another technique is iterative disassembly. De Sutter uses constant propagation to discover control transfer targets, but stops there. Certain embodiments of the present invention can provide an improvement by iteratively applying constant propagation, as well as all of the above optimizations, followed by recursive traversal. Since recursive traversal discovers more code blocks, iteratively applying the techniques above can discover still more control transfers, still more dataflow information, and still more code blocks. The iterations will be stopped once no more code blocks are discovered.

Profiling-based code discovery is a further technique. Certain embodiments of the present binary rewriter operate in two modes. One mode can insert instrumentation code to perform dynamic profiling on the input binary without any optimization. The second mode can re-run the rewriter to perform code optimizations using the collected profile information if available. When such dynamic profiling is done, it can be used to observe, for each unresolved indirect branch, what targets it actually had at run-time. All these targets are certainly code, hence this information can be fed back to the binary rewriter for an optimization pass where they are treated as certain code rather than unknown blocks. With long-running data sets, this profile-based discovery of code blocks can be an exceptionally powerful technique, with the potential to raise coverage to nearly 100%. Further, once a code section block is found to be code using profiling, it no longer needs multiple speculative disassembly versions, reducing code size significantly as well.

Detecting functions can be an important task for the disassembler or rewriter in certain embodiments of the present invention. In rewriting at the granularity of functions as presented, the start and end of functions may need to be detected. Existing rewriters rely on symbolic information in the binary which lists all the functions with their offsets and lengths. Certain embodiments of the present invention forgo the use of symbolic information, and consequently the functions may be derived in another way.

During recursive traversal, all call targets in the program are candidates for the start of functions. Some of these could be to the middle of functions, and those calls to the middle of functions are ideally excluded. In functions, the entire code of the function must be reachable through only branches and jumps (but not calls) from the start of the function. In contrast, no code in another function may be reachable without calls. Hence, if the current entry point is reachable from the previous entry point using only branches and jumps but not calls, then the current entry point must be the middle of a function. This way functions can be detected correctly, without being misled into thinking that the middle-entry to the function starts another function.

Figure 3:
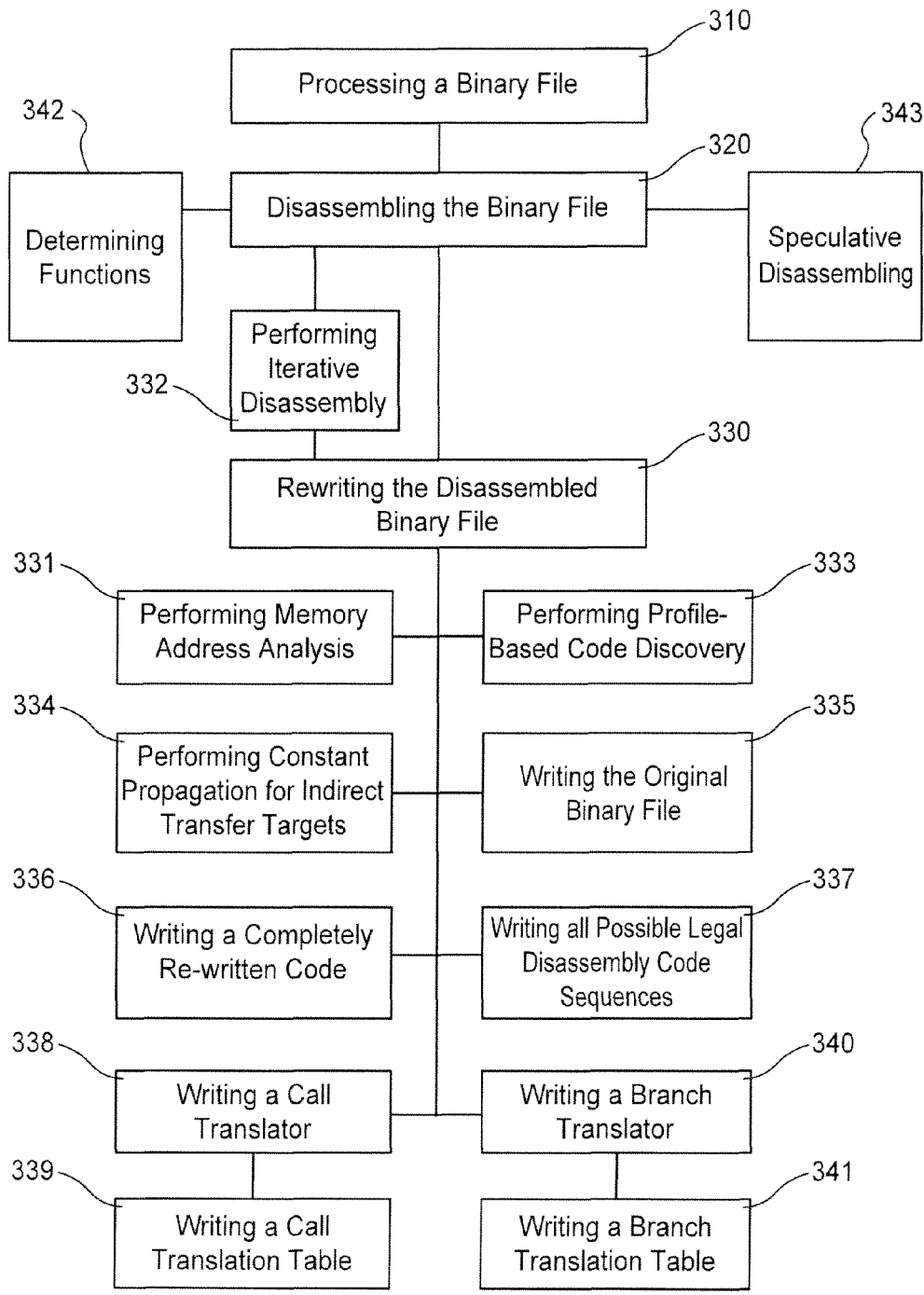
FIG. 3 illustrates a flow chart of a method according to certain embodiments of the present invention.

FIG. 3 illustrates a method according to certain embodiments of the present invention. The method includes processing 310 a binary file as an original binary file. The method also includes disassembling 320 the binary file to provide a disassembled binary file. The method further includes rewriting 330 the disassembled binary file without relocation information to provide a rewritten binary file. The rewriting 330 can provide a physical transformation in a recording medium relative to the binary file in the recording medium prior to the rewriting 330. The processing 310 the binary file, disassembling 320 the binary file. The rewriting 330 the disassembled binary file are performed by a particular machine.

The rewriting 330 can include performing constant reaching-definitions analysis. The rewriting 330 can also include performing 331 memory address analysis. The rewriting 330 and disassembling 320 can further include performing 332 iterative disassembly. Additionally, the rewriting 330 can include performing 333 profiling-based code discovery. Further, the rewriting 330 can include performing 334 constant propagation for indirect transfer targets.

The rewriting 330 can include writing 335, as a part of the rewritten binary file, the original binary file. Optionally, the original binary file may include minor modifications. For example the first instruction of identified functions may be replaced by an interrupt. Moreover, the rewriting 330 can include writing 336, as a part of the rewritten binary file, a completely rewritten code. Furthermore, the writing 336 the completely rewritten code can include writing 337 all possible legal disassembly code sequences.

The rewriting 330 can also include writing 338, as a part of the rewritten binary file, a call translator. The rewriting 330 can further include writing 339, as a part of the rewritten binary file, a call translation table. Furthermore, the rewriting 330 can include writing 340, as a part of the rewritten binary file, a branch translator. Additionally, the rewriting 330 can include writing 341, as a part of the rewritten binary file, a branch translation table. The disassembling 320 can include determining 342 some or all the functions in the input binary. The disassembling 320 can include speculative disassembling 343.

Figure 4:
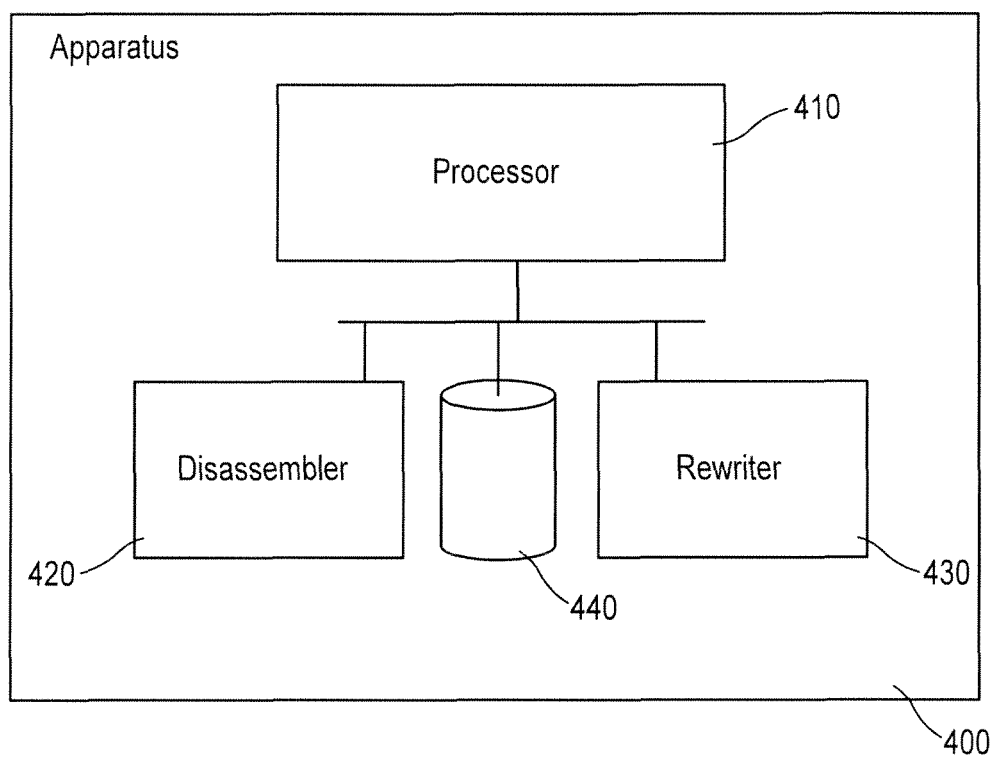
FIG. 4 illustrates an apparatus according to certain embodiments of the present invention.

FIG. 4 illustrates an apparatus according to certain embodiments of the present invention. The apparatus 400 can include a processor 410 configured to process a binary file as an original binary file. The processor 410 is not required to be a microprocessor, although it can be implemented as a routine or set of routines interrelated with and running on a microprocessor. The apparatus 400 can also include a disassembler 420 configured to disassemble the binary file to provide a disassembled binary file. The disassembler 420 similarly may be implemented as a routine or set of routines interrelated with and running on a microprocessor, although disassembler 420 may be implemented in a separate hardware device. The apparatus 400 can further a rewriter 430 configured to rewrite the disassembled binary file without relocation information to provide a rewritten binary file. The rewriter 430 likewise may be implemented as a routine or set of routines interrelated with and running on a microprocessor, although rewriter 430 may be implemented in a separate hardware device. Rewriting can provide a physical transformation in a recording medium 440 relative to the binary file in the recording medium prior to the rewriting. The recording medium 440 is shown as internal to the apparatus 400, but the recording medium 440 may alternatively be external to the apparatus 400.

The rewriter 430 can be configured to perform constant reaching-definitions analysis. The rewriter 430 can also be configured to perform memory address analysis. The rewriter 430 and disassembler 420 can further be configured to perform iterative disassembly. Additionally, the rewriter 430 can be configured to perform profiling-based code discovery.

The rewriter 430 can also be configured to perform constant propagation for indirect transfer targets. Further, the rewriter 430 can be configured to write, as a part of the rewritten binary file, the original binary file. The rewriter 430 can additionally be configured to write, as a part of the rewritten binary file, a completely rewritten code.

Moreover, the rewriter 430 can be configured to write the completely rewritten code by writing all possible legal disassembly code sequences. The rewriter 430 can be configured to write, as a part of the rewritten binary file, a call translator. Also, the rewriter 430 can be configured to write, as a part of the rewritten binary file, a call translation table. The rewriter 430 can be additionally configured to write, as a part of the rewritten binary file, a branch translator. The rewriter 430 can also be configured to write, as a part of the rewritten binary file, a branch translation table.

The disassembler 420 can be configured to determine functions. Additionally, the disassembler 420 can be configured to perform speculative disassembling.

Figure 5:
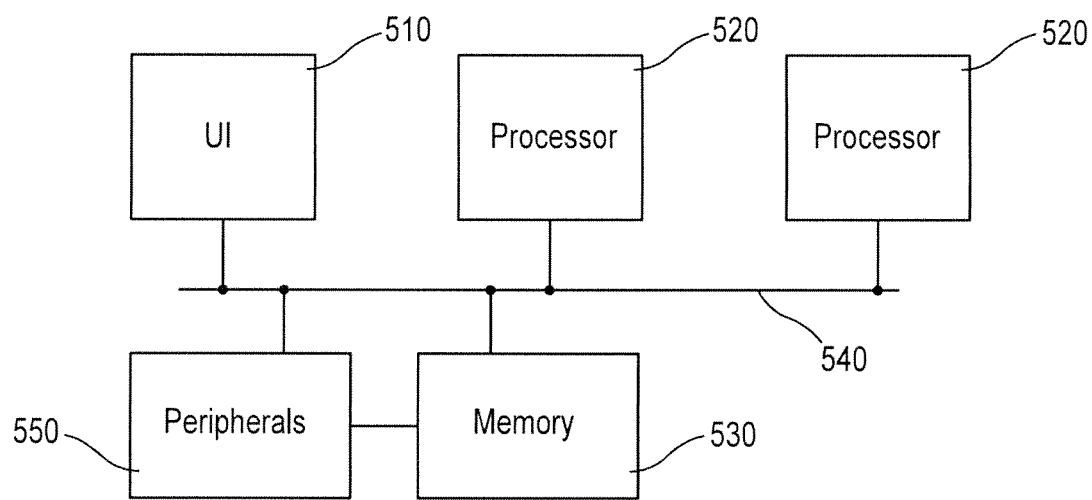
FIG. 5 illustrates another apparatus according to certain embodiments of the present invention.

FIG. 5 illustrates an apparatus according to certain embodiments of the present invention. As shown in FIG. 5, the apparatus may include a user interface (UI) 510, one or more processors 520, and memory 530. The UI 510 may include a monitor or other display device. The processor(s) 520 can be, for example, a central processing unit (CPU) or application specific integrated circuit (ASIC). The memory 530 can be one or more physical device. For example, the memory 530 can include memory incorporated with the processor 520 or memory in a separate storage device, such as a hard disk drive (HDD). Other forms of memory are also permitted. The components of the apparatus may be interconnected by, for example, a bus 540, which may be a physical or logical bus. In an embodiment that does not include an integrated UI, the apparatus can be a blade of a rack-mounted computer system. The apparatus can also include other peripherals 550, such as output devices like a printer or input devices, like a scanner. The processor(s) 520 can be specially designed for functions such as disassembling, determining functions, rewriting binary files, and automatically parallelizing. Alternatively, however the processor(s) 520 can function as a general purpose computer running particular instructions that create a processor, disassembler, and rewriter as discussed above with reference, for example, to FIG. 4.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    processing a binary file in a format that includes indirect control transfers as an original binary file;
    disassembling all the code in the binary file without relocation information to provide a disassembled binary file;
    rewriting the disassembled binary file without relocation to provide a converted program,
    wherein the rewriting provides a physical transformation in a recording medium relative to the binary file in the recording medium prior to the rewriting, and wherein the processing the binary file, disassembling the binary file, and rewriting the converted program are performed by a particular machine.

2. The method of claim 1, wherein the rewriting comprising performing constant reaching-definitions analysis.

3. The method of claim 1, wherein the rewriting comprises performing memory address analysis.

4. The method of claim 1, wherein the rewriting and disassembling comprise performing iterative disassembly.

5. The method of claim 1, wherein the rewriting comprises performing profiling-based code discovery.

6. The method of claim 1, wherein the rewriting comprises performing constant propagation for indirect transfer targets.

7. The method of claim 1, wherein the rewriting comprises writing, as a part of the rewritten binary file, the original binary file.

8. The method of claim 1, wherein the writing the completely rewritten code comprises writing all possible legal disassembly code sequences.

9. The method of claim 1, wherein the rewriting comprises writing, as a part of the rewritten binary file, a call translator.

10. The method of claim 9, wherein the rewriting comprises writing, as a part of the rewritten binary file, a call translation table.

11. The method of claim 1, wherein the rewriting comprises writing, as a part of the rewritten binary file, a branch translator.

12. The method of claim 11, wherein the rewriting comprises writing, as a part of the rewritten binary file, a branch translation table.

13. The method of claim 1, wherein the disassembling comprises determining functions.

14. The method of claim 1, wherein the disassembling comprises speculative disassembling.

15. The method of claim 1, wherein the method is configured to permit transformation or optimization beyond just instrumentation or localized optimization.

16. A non-transitory computer-readable medium encoded with instructions that, when executed in hardware, perform a process, the process comprising:
   processing a binary file in a format that includes indirect control transfers as an original binary file;
   disassembling all the code in the binary file without relocation information to provide a disassembled binary file;
   rewriting the disassembled binary file without relocation information to provide a converted program,
   wherein the rewriting provides a physical transformation in a recording medium relative to the binary file in the recording medium prior to the rewriting, and wherein the processing the binary file, disassembling the binary file, and rewriting the converted program are performed by the hardware.

17. The computer-readable medium of claim 16, wherein the rewriting comprising performing constant reaching-definitions analysis.

18. The computer-readable medium of claim 16, wherein the rewriting comprises performing memory address analysis.

19. The computer-readable medium of claim 16, wherein the rewriting and disassembling comprise performing iterative disassembly.

20. The computer-readable medium of claim 16, wherein the rewriting comprises performing profiling-based code discovery.

21. The computer-readable medium of claim 16, wherein the rewriting comprises performing constant propagation for indirect transfer targets.

22. The computer-readable medium of claim 16, wherein the rewriting comprises writing, as a part of the rewritten binary file, the original binary file.

23. The computer-readable medium of claim 16, wherein the writing the completely rewritten code comprises writing all possible legal disassembly code sequences.

24. The computer-readable medium of claim 16, wherein the rewriting comprises writing, as a part of the rewritten binary file, a call translator.

25. The computer-readable medium of claim 24, wherein the rewriting comprises writing, as a part of the rewritten binary file, a call translation table.

26. The computer-readable medium of claim 16, wherein the rewriting comprises writing, as a part of the rewritten binary file, a branch translator.

27. The computer-readable medium of claim 26, wherein the rewriting comprises writing, as a part of the rewritten binary file, a branch translation table.

28. The computer-readable medium of claim 16, wherein the disassembling comprises determining functions.

29. The computer-readable medium of claim 16, wherein the disassembling comprises speculative disassembling.

30. The computer-readable medium of claim 16, wherein the process is configured to permit transformation or optimization beyond just instrumentation or localized optimization.

31. An apparatus, comprising:
   a processor configured to process a binary file in a format that includes indirect control transfers as an original binary file;
   a disassembler configured to disassemble all the code in the binary file without relocation information to provide a disassembled binary file;
   a rewriter configured to rewrite the disassembled binary file without relocation information to provide a converted program,
   wherein rewriting provides a physical transformation in a recording medium relative to the binary file in the recording medium prior to the rewriting.

* * * * *

UNITED STATES PATENT AND TRADEMARK OFFICE
CERTIFICATE OF CORRECTION

| | | |
|---|---|---|
| PATENT NO. | : 8,510,723 B2 | Page 1 of 1 |
| APPLICATION NO. | : 12/785923 | |
| DATED | : August 13, 2013 | |
| INVENTOR(S) | : Rajeev Barua et al. | |

It is certified that error appears in the above-identified patent and that said Letters Patent is hereby corrected as shown below:

In the Claims:

Column 20, line 58, claim 1:

Please change "rewriting the disassembled binary file without relocation to" to --rewriting the disassembled binary file without relocation information to--

Signed and Sealed this
First Day of October, 2013

Teresa Stanek Rea
*Deputy Director of the United States Patent and Trademark Office*